(12) United States Patent
Jakimov et al.

(10) Patent No.: US 10,442,001 B2
(45) Date of Patent: Oct. 15, 2019

(54) RAPID MANUFACTURING METHOD AND DEVICE FOR THE SAME COMPRISING OPPOSITELY-DIRECTED PROTECTIVE GAS STREAMS PARALLEL TO THE POWDER LAYER

(71) Applicant: MTU Aero Engines AG, Munich (DE)

(72) Inventors: Andreas Jakimov, Munich (DE); Thomas Hess, Munich (DE); Georg Schlick, Munich (DE); Alexander Ladewig, Bad Wiessee (DE)

(73) Assignee: MTU Aero Engines AG, Munich (DE)

( * ) Notice: Subject to any disclaimer, the term of this patent is extended or adjusted under 35 U.S.C. 154(b) by 169 days.

(21) Appl. No.: 15/320,131

(22) PCT Filed: Apr. 29, 2015

(86) PCT No.: PCT/DE2015/000206
§ 371 (c)(1),
(2) Date: Dec. 19, 2016

(87) PCT Pub. No.: WO2015/197039
PCT Pub. Date: Dec. 30, 2015

(65) Prior Publication Data
US 2017/0136696 A1    May 18, 2017

(30) Foreign Application Priority Data

Jun. 24, 2014 (DE) ........................ 10 2014 212 100

(51) Int. Cl.
*B29C 64/393* (2017.01)
*B22F 3/10* (2006.01)
(Continued)

(52) U.S. Cl.
CPC .......... *B22F 3/1007* (2013.01); *B22F 3/1055* (2013.01); *B29C 64/153* (2017.08);
(Continued)

(58) Field of Classification Search
CPC ... B29C 64/153; B29C 64/20; B29C 64/1055; B29C 64/105; B22F 2003/1056; B22F 3/1055; B23K 26/142
See application file for complete search history.

(56) References Cited

U.S. PATENT DOCUMENTS 6,751,516 B1    6/2004  Richardson
2015/0174823 A1*  6/2015  Wiesner ................ B29C 64/153
                                                264/497
(Continued)

FOREIGN PATENT DOCUMENTS

DE    102004031881 A1    1/2006
DE    102006014835 A1    10/2007
(Continued)

*Primary Examiner* — Robert C Dye
*Assistant Examiner* — Cedrick S Williams
(74) *Attorney, Agent, or Firm* — Barlow, Josephs & Holmes, Ltd.

(57) ABSTRACT

The invention relates to a device and a method for the additive manufacture of components through the layered bonding of powder particles to one another and/or to a semi-finished product or substrate already produced, using selective interaction of the powder particles with a high-energy beam, wherein, during the bonding of the powder particles into a layer made of powder particles with the aid of the high-energy beam, a gas flow, which has a flow direction having a directional component directed at least partially parallel to the layer of powder particles, is provided across the layer of powder particles and/or the bonding region in the layer of powder particles, wherein the directional component of the gas flow directed at least partially parallel to the layer of powder particles during the bonding of the powder particles in a layer is generated in at least two directions, which have oppositely directed directional components.

10 Claims, 4 Drawing Sheets

(51) Int. Cl.
  *B22F 3/105* (2006.01)
  *B33Y 10/00* (2015.01)
  *B33Y 30/00* (2015.01)
  *B29C 64/153* (2017.01)
  *B29C 64/20* (2017.01)
(52) U.S. Cl.
  CPC .............. *B29C 64/20* (2017.08); *B33Y 10/00* (2014.12); *B33Y 30/00* (2014.12); *B22F 2003/1056* (2013.01); *Y02P 10/295* (2015.11)

(56) References Cited

U.S. PATENT DOCUMENTS

| | | | |
|---|---|---|---|
| 2015/0283761 A1* | 10/2015 | Maeda | B33Y 10/00 264/408 |
| 2016/0136731 A1* | 5/2016 | McMurtry | B22F 3/1055 419/53 |

FOREIGN PATENT DOCUMENTS

| | | | | |
|---|---|---|---|---|
| DE | 102010050531 A1 | | 3/2012 | |
| DE | 102010052206 A1 | | 5/2012 | |
| DE | 102014209161 A1 | * | 11/2015 | ........... B23K 26/342 |
| DE | 102014209161 A1 | | 11/2015 | |
| EP | 0206080 A2 | | 12/1986 | |
| EP | 2862651 A1 | | 4/2015 | |
| WO | 9208592 A1 | | 5/1992 | |
| WO | 9824574 A1 | | 6/1998 | |
| WO | 2014199149 A1 | | 12/2014 | |

* cited by examiner

RAPID MANUFACTURING METHOD AND DEVICE FOR THE SAME COMPRISING OPPOSITELY-DIRECTED PROTECTIVE GAS STREAMS PARALLEL TO THE POWDER LAYER

BACKGROUND OF THE INVENTION

Field of the Invention

The present invention relates to a method and a device for the additive manufacture of components through the layered bonding of powder particles to one another and/or to a semi-finished product or substrate already produced, using selective interaction of the powder particles with a high-energy beam, in particular a method and a device for selective laser or electron beam melting.

Prior Art

Additive manufacturing methods for the manufacture of a component, such as, for example, selective laser melting, selective electron beam melting, or laser deposition welding, in which the component is built up layer by layer using powdered material, are employed in industry for so-called rapid tooling and rapid prototyping, or also for the manufacture of series products in the framework of rapid manufacturing. In particular, methods of this kind can also be employed for the manufacture of turbine parts, particularly of parts for aircraft engines, in which, for example, on account of the material used, additive manufacturing methods of this kind are advantageous. An example of this is found in DE 10 2010 050 531 A1.

However, the additive manufacture with application of material, layer by layer, can result in the creation of vaporized material from the melt or in the formation of weld spatters, which can be detrimental to the additive fabrication. Thus, on the one hand, the condensate of vaporized material can impair the coupling of the high-energy beam in the powder, and the deposit of weld spatters on powdered material that has not yet fused can result in the creation of material flaws in subsequent welding processes. As a result, the component can break down or fail during later use and this must be correspondingly prevented.

In order to prevent vaporized material from impairing the irradiation of the material powder to be applied, it has already been proposed to use streams of protective gas, such as disclosed, for example, in DE 10 2006 014 835 A1, DE 10 2010 052 206 A1, or WO 98/24574 A1. Besides stationary devices for generating a flow of gas over the powder layer to be deposited so as to create a stream of protective gas, also a mobile nozzle for local generation of a stream of protective gas directly in the area of impingement of the laser beam is known from these documents. However, a mobile nozzle of this kind, which has to be moved together with the beam, is very complicated to manipulate.

In addition, both for the mobile device for generating a stream of protective gas and for the stationary devices for generating a stream of protective gas, it is not possible to eliminate or diminish the problems with weld spatters in all areas of the processing area in the same way.

Furthermore, WO 92/08592 A1 shows a gas flow device for selective laser sintering, in which the gas flow is to be influenced by adjustment of the temperature.

SUMMARY OF THE INVENTION

Object of the Invention

The object of the present invention is therefore to provide a method and a device for the additive manufacture of components through the layer-by-layer bonding of powder particles to one another and/or to a semi-finished product or substrate already produced, using selective interaction of powder particles with a high-energy beam, in which the above-depicted problem of impairment of the high-energy beam by vaporized material or condensates thereof as well as material flaws due to weld spatters can be prevented or at least reduced. At the same time, the method should be simple to implement and the device should be simply constructed and easy to operate, so as to be able to employ the corresponding additive manufacture in industrial processes.

Technical Solution

This object is achieved by a method as well as a device of the present invention. Advantageous embodiments are discussed detail below.

For achieving the above-depicted object, the invention resorts first of all, as in the prior art, to the generation of a stream of protective gas over the layer of powder particles that are to be bonded to one another in order to produce the component. The gas flow of the stream of protective gas is adjusted in this case so that it has a flow direction that has at least one directional component directed parallel to the layer of the powder particles to be bonded. In this way, vaporized material from the melt can be carried away with the gas flow, so that it can no longer represent any impairment to the high-energy beam. In addition, it is possible with the gas flow of the stream of protective gas to also prevent material spatters or to also divert them into regions, such as, for example, already fused regions or already resolidified regions in which weld spatters are not critical for subsequent processing or in which the weld spatters can again be readily removed.

In accordance with the invention, it is further provided that the flow direction can be altered during the deposition of a single layer such that at least two different flow directions of the gas flow exist and the flow directions of the gas flow have oppositely directed directional components. As a result of the different, at least partially opposite directions of the gas flow of the stream of protective gas, it is possible to adjust the direction of movement of the high-energy beam relative to the powder to be bonded and/or the irradiation sequence of different regions of the powder layer, and the flow direction of the stream of protective gas can be taken into account in such a way that impairments of the high-energy beam by vaporized material and condensate formation following vaporization of the material as well as material flaws due to weld spatters can be prevented or reduced.

A directional component of the flow direction is understood, when the flow direction is regarded as a vector, as being a corresponding vector that represents the corresponding directional component in terms of a vector addition.

Through the provision of at least two different flow directions within the deposition process of a single powder layer that have at least partially opposite directional components, it can be ensured that the direction of movement of the high-energy beam can occur outward from a central region of the processing region, such as, for example, a central region of a powder bed, with, at the same time, the direction of the stream of protective gas being opposite to the direction of movement of the high-energy beam relative to the powder to be applied. Through the opposite direction of flow of the gas flow of the stream of protective gas in relation to the direction of movement of the high-energy beam, it is ensured that vaporized material is carried away from the high-energy beam, so that no interactions of the vaporized material or clouds of condensate with the beam need be anticipated. In addition, weld spatters can be diverted in the direction of the already melted region.

In addition, the realization of at least partially oppositely directed flow directions of the gas flow of the stream of protective gas enables the irradiated regions to be chosen such that the irradiation occurs in a central region of the processing region with irradiation of the powder layer by the high-energy beam occurring as perpendicularly as possible, because weld spatters can then be reduced or can be produced in regions that have already fused or have already resolidified.

According to a preferred embodiment, the gas flow of the stream of protective gas can be created parallel to the layer of the powder particles to be bonded and, in particular, parallel to the surface of a powder bed in which the component to be produced is fabricated.

Furthermore, the flow of gas can be adjusted during the deposition of the layer at least in a first direction and in another second direction that is opposite to the first direction.

For this purpose, a corresponding device for the additive manufacture of components by layered bonding of powder particles can have at least one gas inlet and at least one gas outlet, which are arranged opposite-lying to each other on different sides of the processing region and can each be operated both as gas inlet and gas outlet. In this way, it is possible in a simple way to bring about a reversal of the flow direction of the gas flow of a stream of protective gas. Alternatively and additionally, it is possible to provide a plurality of gas outlets and gas inlets, with it being possible to provide at least two gas inlets on opposite-lying sides of the processing region and to arrange the corresponding gas outlets on the respective opposite-lying side for each of the gas inlets, so that, as needed, the direction of flow of a gas flow of a stream of protective gas can be created in one direction or in the opposite direction.

Moreover, it is possible to arrange a plurality of gas inlets and gas outlets around the processing region, that is, the region of the component holder with the applied powder or a powder bed, so that different directions of flow can be created. The adjustable flow directions of the gas flow of the stream of protective gas can enclose any angle between them.

Furthermore, it is also possible to realize the at least partially opposite flow directions of the gas flow of the stream of protective gas also by using nozzles that can travel together with the beam by providing at least two nozzles or by providing a nozzle that can pivot relative to the beam.

Depending on the direction of movement of the high-energy beam relative to the powder to be bonded and/or depending on an irradiation sequence with which the high-energy beam irradiates different regions of the powder layer in succession, it is possible to choose the favorable flow direction in each case. In particular, the flow direction can always be chosen to be opposite to the direction of movement of the high-energy beam relative to the powder.

BRIEF DESCRIPTION OF THE FIGURES

The appended drawings show in purely schematic fashion in

DESCRIPTION OF THE INVENTION

Further advantages, characteristics, and features of the present invention will become clear in the following detailed description of exemplary embodiments, with the invention not be limited to these exemplary embodiments.

Figure 1:
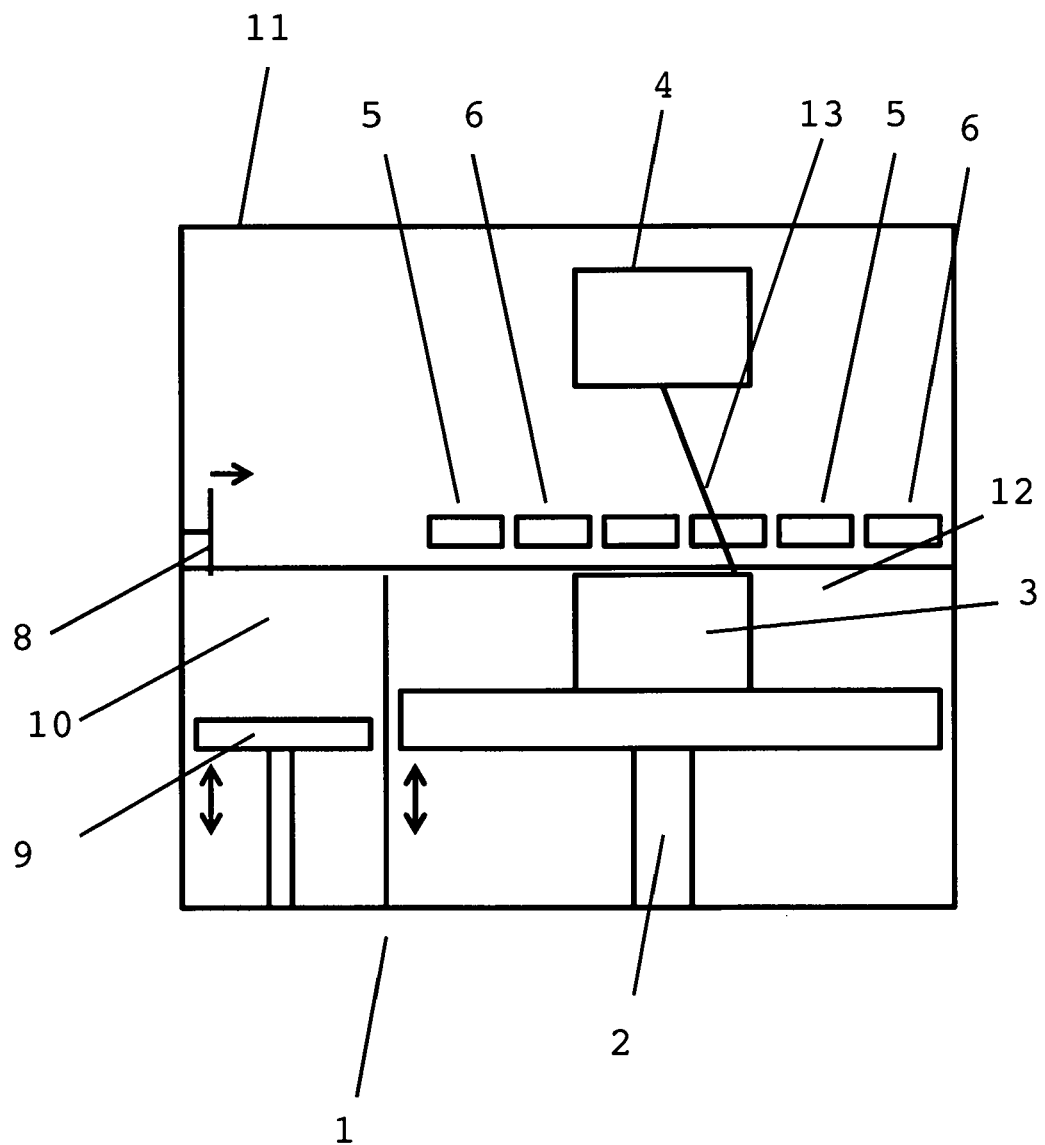
FIG. 1, a schematic illustration of a device for the additive manufacture of components through selective laser melting by way of example.

FIG. 1 shows, in a purely schematic illustration, a device 1, such as one finding use, for example, for the selective laser melting for additive manufacture of a component. The device 1 comprises a lift table 2, on the platform of which a semi-finished product 3 is arranged, on which the material is deposited layer by layer in order to produce a three-dimensional component. For this purpose, powder, situated above a lift table 9 in a powder hopper 10, is pushed by means of a slider 8, layer by layer over the semi-finished product 3 and subsequently fused by the laser beam 13 of a laser 4 to bond it with the already present semi-finished product 3. The bonding of the powder material in a powder layer with the semi-finished product 3 is carried out by the laser 4 depending on the desired contour of the component to be fabricated, so that any three-dimensional forms can be produced. Correspondingly, the laser beam 13 is guided over the powder bed 12 in order to fuse the powder material, through different points of impingement on the powder bed, in accordance with the contour of the three-dimensional component in the sectional plane corresponding to the powder sectional plane and to bond it with the already produced part of a component or with an initially already provided substrate. In the process, the laser beam 13 can be guided over the surface of the powder bed 12 by way of a suitable deflecting unit and/or the powder bed could be moved with respect to the laser beam 13.

In order to prevent undesired reactions with the ambient atmosphere during fusing, the process is carried out in an enclosed space, which is provided by a housing 11 of the device 1 and, in addition, an inert gas atmosphere is provided in order to prevent, for example, oxidation of the powder material, and the like, during deposition. As inert gas, it is possible to use nitrogen, for example, which is supplied via a gas source that is not illustrated.

Instead of nitrogen, it is also possible to use other suitable inert gases.

Moreover, other kinds of irradiation are also conceivable, such as, for example, electron beams or other particle beams or light beams that are employed in stereolithography.

Figure 2:
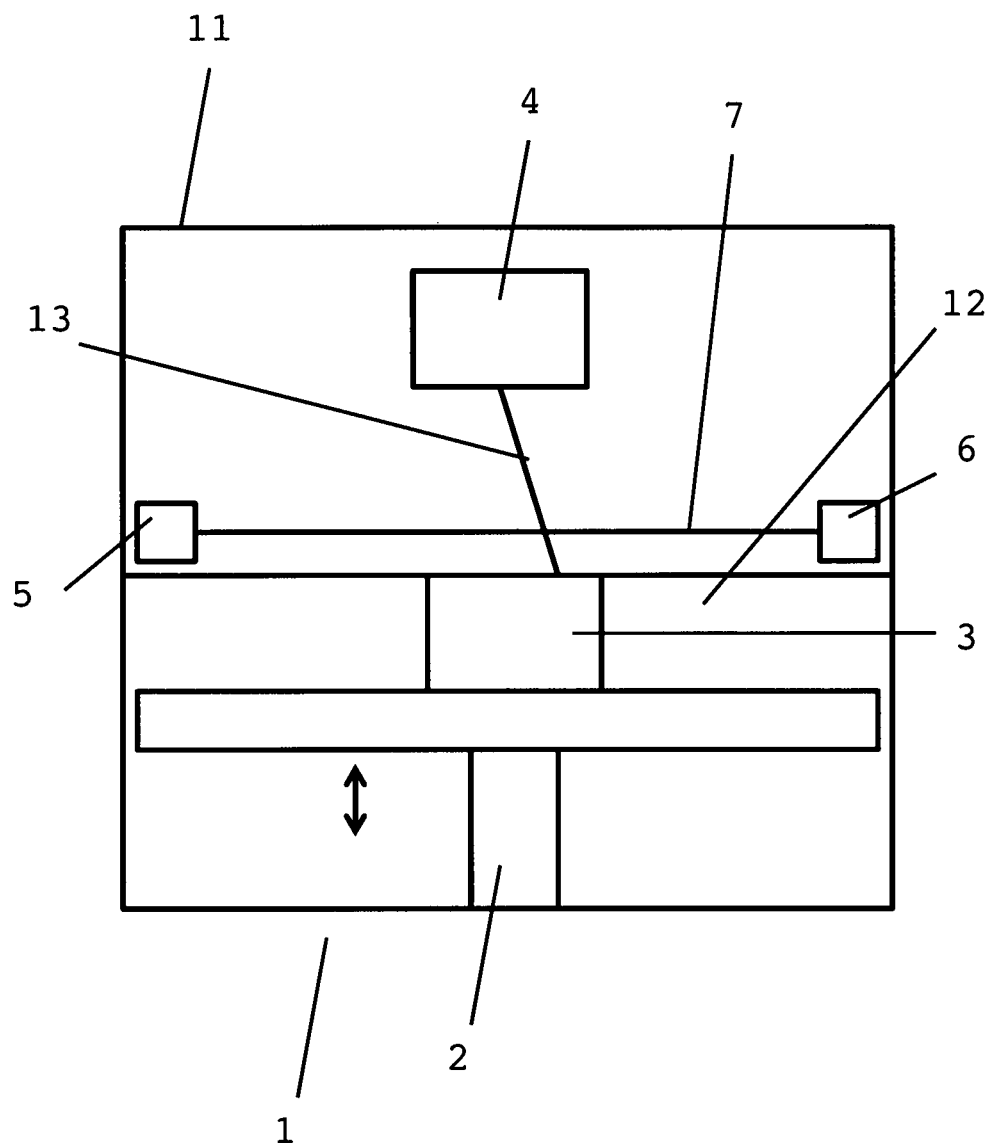
FIG. 2, an illustration of the device of FIG. 1 rotated by 90°.

Provided at two opposite-lying sides of the powder bed 12 or the processing region in the component holder, which is defined essentially by the powder bed, are a plurality of gas inlets 5 in the form of nozzles and a plurality of gas outlets 6 in the form of suction orifices, in order to generate a gas flow 7 parallel to the surface of the powder bed 12 (see FIG. 2). As a result of the gas flow 7 of an inert gas, the powder bed 12 is protected additionally from any possible oxidation or other contaminations, on the one hand, because the gas flow 7 creates a kind of protective shield. On the other hand, the gas flow 7 parallel to the surface of the powder bed 12, in addition, offers the possibility of entraining and carrying away in the gas flow any vaporized material emitted from the melt bath and condensate formed from it as well as weld spatters escaping from the melt, in order to prevent thereby such vaporized material from interfering with the energy input by the high-energy laser beam 14 or weld spatters from settling on the powder bed 12, mixing with still bulk powder, and leading to material flaws.

In order to be able to alter the direction of flow of the gas flow 7 at least between two opposite directions, it is possible to provide both on the one side and on the opposite-lying side of the powder bed 12 both gas inlets 5 and gas outlets 6. In the illustration of FIG. 1, the gas inlets 5 and gas outlets 6, which are arranged in alternation, can be seen on one side of the processing region, while, in FIG. 2, for the sectional illustration rotated by 90°, the gas flow 7 can be seen between the gas inlets 5 and gas outlets 6, which lie opposite each other.

Figure 3:
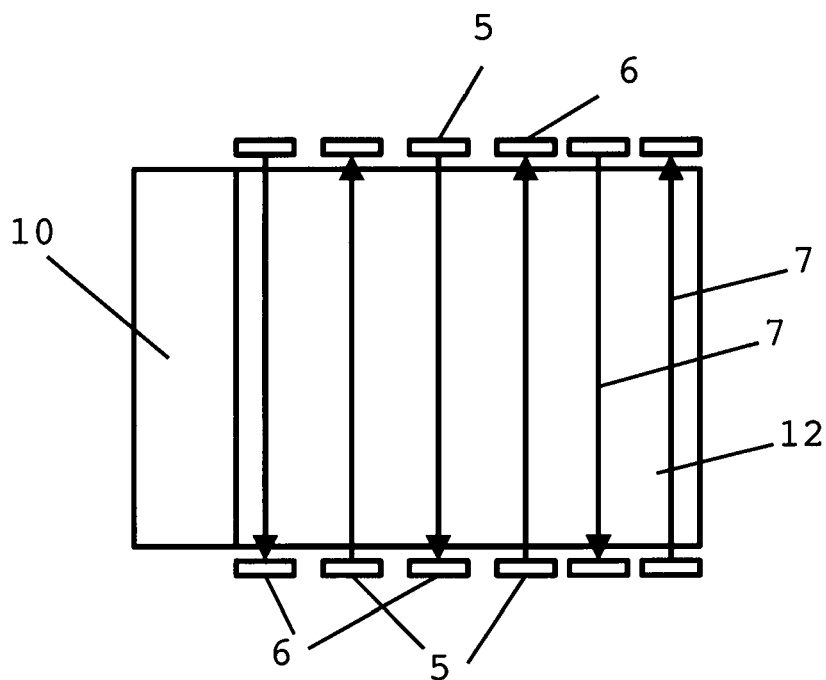
FIG. 3, a plan view of the powder hopper and the powder bed or the component holder of the device of FIGS. 1 and 2.

FIG. 3 shows, in another illustration in a plan view, the possibility of being able to create the opposite flow directions of the gas flow 7 through the arrangement of alternating gas inlets 5 and gas outlets 6, which lie opposite each other. Although, in FIG. 3, both directions of flow are shown for the gas flow 7, only a single direction of flow is realized during operation of the device, namely, either in the one direction or in the other direction or, when a single layer is applied, initially in the one direction and then in the opposite direction.

Figure 4:
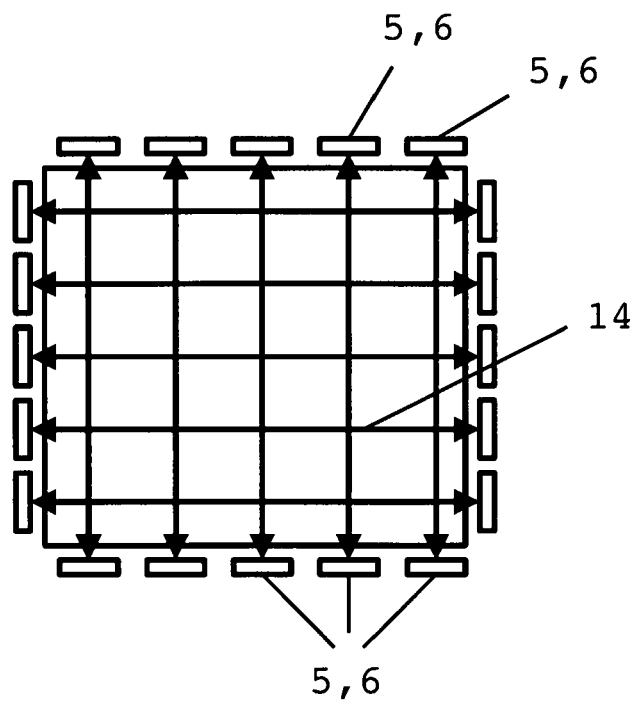
FIG. 4, an illustration of another embodiment of a device according to the invention in a plan view similar to FIG. 3.
Figure 5:
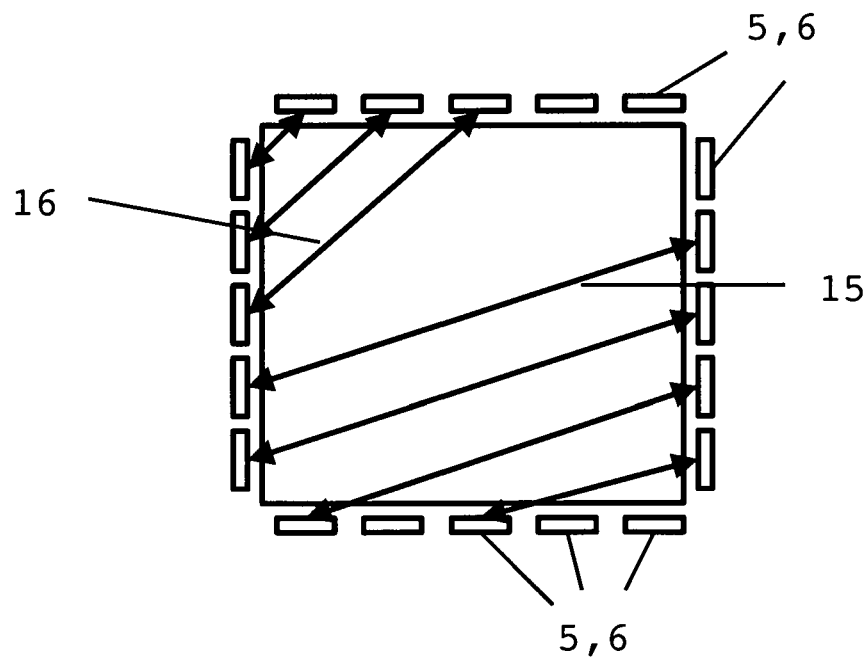
FIG. 5, an illustration of another embodiment of a device according to the invention in a plan view similar to the illustration of FIG. 4; and in FIG. 6, an illustration of the beam movement and of the irradiation sequence with simultaneous illustration of the flow direction of a gas flow in a plan view of the powder bed or the component holder of a device similar to the illustration of FIG. 3

FIG. 4 shows, in a similar illustration of a plan view of the powder bed or of the processing region, another possibility for designing a device for producing a gas flow 7 over the powder bed 12, in which a plurality of gas inlets 5 and gas outlets 6 are arranged around the entire powder bed region or processing region, each of which, however, are integrated into one another, so that the gas inlet 5 can function at the same time as gas outlet 6. In this way, it is possible to use the same gas inlets and outlets to create gas flows with opposite directions of flow, as indicated in FIG. 4 by the double arrow 14. Through the arrangement of the integrated gas inlets and gas outlets 5, 6 around the entire processing region, it is possible not only to realize opposite flow directions of the gas flow, but also to realize many flow directions 15, 16 of the gas flow at different angles with respect to each other, as is illustrated in FIG. 5. In FIG. 5, a first and a second direction of flow are shown. However, more than two different directions of flow with different angles with respect to each other are possible. In this way, it is possible to adapt the gas flow of the inert gas over the powder bed in a variable manner to the direction of movement and the irradiation sequence of the laser beam.

Figure 6:
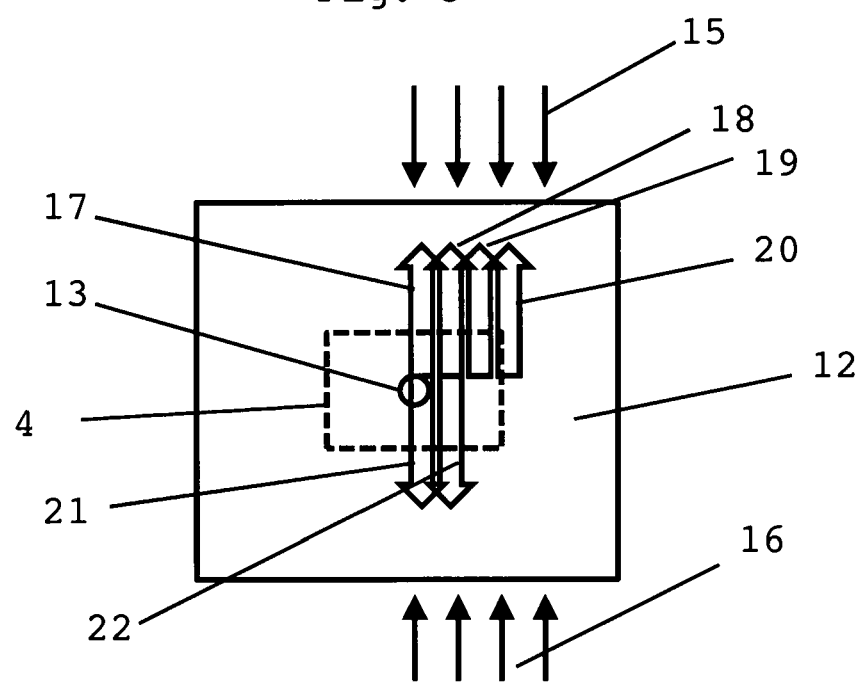

FIG. 6 shows an example of how the laser beam 13 can be moved in succession along various irradiation tracks 17 to 22 for different flow directions 15, 16 of the gas flow 7. First of all, the laser beam 13 is directed onto the powder in accordance with the irradiation track 17 in a central region of the processing region, for example in the center of the powder bed, directly beneath the laser beam source 4, and then moved outward opposite to the first flow direction 15 of the gas flow. Subsequently, in another irradiation track 18, which is displaced outward with respect to the irradiation track 17 in a direction transverse to the direction of movement of the laser beam in the irradiation tracks 17 to 22, a laser irradiation with powder fusion is again carried out outward from the central region opposite to the stream of the gas flow 7. This is repeated for the four irradiation tracks 17 to 20, which are illustrated side by side. In all of these cases, the first flow direction 15 is opposite to the direction of movement of the laser beam in the irradiation tracks 17 to 20.

For the irradiation tracks 21, 22, which are performed in the irradiation sequence as numbers 5 and 6, the laser beam 13 is again guided outward from a central inner region, with, in this case, however, the second flow direction 16 of the gas flow 7 being adjusted to be opposite to the preceding first flow direction 15 and, in turn, opposite to the direction of movement of the laser beam 13.

As a result of the direction of movement of the laser beam 13 being opposite to the flow direction of the gas flow in each case, material vaporized from the melt is prevented from reaching the region of the laser beam 14 and thereby being able to impair the coupling of the laser beam in the powder material. The start of the irradiation in a central region with direct radiation of the laser beam perpendicular to the powder region makes it possible to reduce weld spatters, because weld spatters can be largely prevented when irradiation is perpendicular. As a result of the subsequent movement of the laser beam 13 outward, it is possible, when the laser beam irradiates the powder at an angle, to divert escaping weld spatters onto already fused or resolidified material by way of the gas flow directed oppositely to the direction of movement of the laser beam, so that any impairment of powder that has not yet fused can be prevented. Moreover, by starting the irradiation in a central region with a direction of movement of the laser beam 13 outward, it is possible to start adjacent to a possibly already fused region, so that, here, too, prevention of any contamination of the powder by weld spatters is additionally afforded.

Correspondingly, it is possible, through the irradiation sequence starting from irradiation regions near to the central region and subsequent irradiation of regions in the direction of the edge of the processing region or of the powder bed, to ensure that the weld spatters are produced essentially in regions that have already melted or have already resolidified, because, through the deflection of the laser beam, the weld spatters collect on the side of the melt bath that faces the center of the build-up platform.

When the laser source 4 is not arranged centrally with respect to the processing region, the start of the irradiation can be undertaken in a region in which it is possible for the impingement of the laser beam 13 on the powder to be bonded to occur as perpendicularly as possible.

The depicted device and the described method with oppositely directed flow directions of a flow of inert gas enable an optimized processing to occur, which prevents both any impairment of the laser beam by vaporized material from the melt and any contamination of not yet fused powder material by weld spatters.

Although the present invention has been described in detail on the basis of exemplary embodiments, it is obvious to the person skilled in the art that the invention is not limited to the exemplary embodiments, but rather modifications are possible in such a way that individual features can be omitted or different combinations of features realized, as long as there is no departure from the protective scope of the appended claims. The present invention encompasses all combinations of individual features presented.

The invention claimed is:

1. A method for the additive manufacture of components through the layered bonding of powder particles to one another and/or to a semi-finished product or substrate already produced, using selective interaction of the powder particles with a high-energy beam, wherein, during the bonding of the powder particles into a layer made of powder particles with the aid of the high-energy beam, a gas flow, which has a flow direction having a directional component directed at least partially parallel to the layer of the powder particles, is provided across the layer of powder particles and/or the bonding region in the layer of powder particles; and altering the directional component of the gas flow during at least one bonding step, wherein the directional component of the gas flow directed at least partially parallel to the layer of powder particles during the bonding of the powder particles in a layer is generated in at least two directions, which have oppositely directed directional components.

2. The method according to claim 1,
wherein the gas flow is adjusted parallel to the layer of the powder particles to be bonded.

3. The method according to claim 1,
wherein the gas flow during the bonding of the powder particles in a layer occurs in a first direction and in a second direction that is opposite to the first direction.

4. The method according to claim 1,
wherein the direction of flow of the gas flow over the layer of the powder particles to be bonded is chosen from a plurality of different directions of flow.

5. The method according to claim 1,
wherein the direction of flow is chosen depending on a direction of movement with which the high-energy beam is moved relative to the powder to be bonded and/or depending on an irradiation sequence with which the high-energy beam irradiates regions of the powder layer in succession.

6. The method according to claim 1,
wherein the direction of flow is adjusted to be opposite to a direction of movement with which the high-energy beam is moved relative to the powder to be bonded.

7. The method according to claim 1,
wherein a direction of movement with which the high-energy beam is moved relative to the powder to be bonded is adjusted such that the beam moves outward from a central region of the layer of powder particles and/or a region near the radiation source, and/or the irradiation sequence is chosen such that the regions initially irradiated lie closer to a central region of the layer of the powder particles and/or a region near the radiation source of the high-energy beam, and subsequently, regions are irradiated that lie further remote from it.

8. The method according to claim 1,
wherein the gas flow is supplied by an inert gas.

9. A device for the additive manufacture of components through the layered bonding of powder particles to one another and/or to a semi-finished product or substrate already produced, using selective interaction of the powder particles with a high-energy beam, comprising a beam-generating device for generation of a high-energy beam and with a component holder, in which the powder to be bonded using the high-energy beam is arranged, and with a stationary unit for generation of a gas flow with a gas inlet and a gas outlet, or with a mobile device for generation of a gas flow, with a nozzle that can move together with the high-energy beam for generation of a local flow of gas at the region of impingement of the beam on the powder, wherein the stationary device for generation of a gas flow is configured so that the gas inlet is also operated as a gas outlet, and the gas outlet is also operated as a gas inlet, and/or in such a way that a plurality of gas inlets and gas outlets are provided, wherein at least two gas inlets and/or two gas outlets are configured facing each other, or that the mobile device generates different directions of flow with respect to the component to be produced.

10. The device according to claim 9,
wherein a plurality of gas inlets and gas outlets are arranged distributed around the component holder, and/or in that at least one gas inlet and at least one gas outlet are arranged on two opposite-lying sides of the component holder in each case.

* * * * *